United States Patent
Wendler et al.

(10) Patent No.: US 7,144,076 B2
(45) Date of Patent: Dec. 5, 2006

(54) PRECISELY SPACED ASSEMBLY OF A ROOF MODULE AND A VEHICLE BODY

(75) Inventors: Roland Wendler, Boeblingen (DE); Thomas Zirbs, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/535,797

(22) PCT Filed: Oct. 29, 2003

(86) PCT No.: PCT/EP03/11978

§ 371 (c)(1),
(2), (4) Date: Nov. 14, 2005

(87) PCT Pub. No.: WO2004/048154

PCT Pub. Date: Jun. 10, 2004

(65) Prior Publication Data

US 2006/0237997 A1   Oct. 26, 2006

(30) Foreign Application Priority Data

Nov. 22, 2002   (DE) .............................. 102 54 573

(51) Int. Cl.
*B62D 25/06* (2006.01)
(52) U.S. Cl. .................. 296/210; 296/214; 296/216.08
(58) Field of Classification Search ................ 296/210, 296/214, 190.08, 190.12, 193.04, 216.06–216.08
See application file for complete search history.

(56) References Cited

U.S. PATENT DOCUMENTS

| | | | |
|---|---|---|---|
| 6,027,160 A * | 2/2000 | Brodt et al. ................ 296/210 |
| 6,213,542 B1 * | 4/2001 | Clift .......................... 296/214 |
| 6,367,872 B1 | 4/2002 | Böhm et al. |
| 6,378,936 B1 * | 4/2002 | Grimm et al. .............. 296/214 |
| 6,409,258 B1 * | 6/2002 | Grimm et al. ......... 296/216.08 |
| 6,550,851 B1 * | 4/2003 | Seifert ........................ 296/210 |
| 6,869,119 B1 * | 3/2005 | Ito et al. .................... 296/1.02 |
| 7,000,980 B1 * | 2/2006 | Lutz et al. .................. 296/214 |
| 2002/0005656 A1 | 1/2002 | Seifert |
| 2005/0104418 A1 * | 5/2005 | Zirbs .......................... 296/210 |

FOREIGN PATENT DOCUMENTS

| | | |
|---|---|---|
| DE | 197 09 016 | 9/1998 |
| DE | 101 09 646 | 9/2002 |

* cited by examiner

*Primary Examiner*—D. Glenn Dayoan
*Assistant Examiner*—Greg Blankenship
(74) *Attorney, Agent, or Firm*—Davidson, Davidson & Kappel, LLC

(57) ABSTRACT

The invention relates to the assembly of a roof module and a vehicle body. The roof module lies on flanges of the roof section of the vehicle body and is bonded to said flanges by means of an adhesive layer. To obtain a desired, predetermined thickness for the adhesive layer between the roof module and flanges by a reliable process and to prevent adhesive from escaping from the bonding area, spacers are provided in the area of the flange. Said spacers allow the distance between the interior surface of the module, said surface facing the flange, and the upper surface of the flange, said surface facing the roof module, to be set to a predetermined measurement.

7 Claims, 4 Drawing Sheets

PRECISELY SPACED ASSEMBLY OF A ROOF MODULE AND A VEHICLE BODY

The present invention relates to an assembly of a roof module with a vehicle body, which are joined together using an adhesive bonding process.

BACKGROUND

German Patent Application DE 197 09 016 A1 describes a roof module, which is installed in a roof opening of the vehicle body during vehicle assembly, using an adhesive bonding process. To this end, the roof module is provided at its edge with a flange which extends all around and which, in the assembly position, overlaps an opening flange in the roof opening of the vehicle body and is joined thereto by adhesive beads. The roof module includes an outer shell formed from a metallic material, such as sheet steel, and an inner shell, which is formed from a foamed plastic and connected to the outer shell in sandwich fashion. The inner shell is provided with receiving grooves for adhesive molded into the foamed plastic in the region where the inner shell is supported on the opening flanges of the vehicle body. These receiving grooves prevent the adhesive from leaking out and are dimensioned so as to provide an adapted channel for the adhesive bead.

While in the case of the composite roof of German Patent Application DE 197 09 016 A1, an adapted adhesive channel may be provided by suitably shaping the plastic inner shell, this is generally not the case, especially when using glass roofs, roof opening systems, and roof modules made of certain metallic materials (such as sheet aluminum) because, in this case, molding-in of adhesive channels is not possible, economically not practicable, and not feasible with sufficient accuracy and reproducibility. In this case, therefore, the connection area between the roof module and the roof opening must be designed in an alternative manner, ensuring that the adhesive is arranged in the desired position and shape between the inner surface of the roof module and the upper surface of the opening flanges. In this instance, the roof module must be reproducibly connected to the flanges of the roof opening in such a way that, on the one hand, excessive squeezing of the adhesive bead and the associated risk of adhesive leakage are prevented. On the other hand, it must be ensured, with high process reliability, that the adhesive bead spans the gap between the inner surface of the roof module and the upper surface of the flanges, thus providing a sealing connection between the roof module and the roof opening.

SUMMARY OF THE INVENTION

An object of the present invention is to design the assembly of a roof module, in particular a glass roof, with a roof opening of a vehicle body in such a manner that a sealing and dirt-free adhesively bonded connection between the inner surface of the roof module and the upper surface of the opening flanges is ensured with high process reliability.

The present invention provides an assembly of a roof module with a vehicle body, which are joined together using an adhesive bonding process, the roof module resting with its outer edges on opening flanges in a roof opening of the vehicle body and being permanently connected to these opening flanges using at least one adhesive bead, wherein in the area of the opening flanges, at least one spacer is provided by which the distance between the inner surface of the roof module, said inner surface facing the opening flange, and the upper surface of the opening flange, said upper surface facing the roof module, is set to a predetermined value; the at least one spacer being formed by a turned-up edge region of the opening flange. The present invention also provides an assembly of a roof module with a vehicle body, which are joined together using an adhesive bonding process, the roof module resting with its outer edges on opening flanges in a roof opening of the vehicle body and being permanently connected to these opening flanges using at least one adhesive bead, wherein in the area of the opening flanges, at least one spacer is provided by which the distance between the inner surface of the roof module, said inner surface facing the opening flange, and the upper surface of the opening flange, said upper surface facing the roof module, is set to a predetermined value; the at least one spacer being formed by a plug-in element having a fixing tongue which is supported in a pocket of the opening flange.

Thus, spacers are provided on the roof opening of the vehicle body in the area of the opening flanges. The distance between the inner surface of the roof module, said inner surface facing the opening flange, and the upper surface of the opening flange, said upper surface facing the roof module, is set by these spacers to a predetermined value.

These spacers create a gap in the connection area between the roof module and the opening flange, said gap having a predetermined clear height adapted to the cross-sectional profile of the adhesive bead. The gap height is such that, on the one hand, the gap is bridged by the adhesive and, on the other hand, that the adhesive bead is not excessively squeezed, so as to maintain the minimum adhesive thickness required for a reliable connection between the vehicle body and the roof module and to prevent adhesive from being squeezed out of the connection area. Setting the adhesive gap using the spacers at the same time ensures that the upper surface of the roof module assumes a predefined position relative to the side rails of the vehicle body, thereby achieving the desired appearance of the roof surface with respect to the vehicle body.

The spacers allow precise and reproducible (local) setting of the gap between arbitrarily shaped roof modules and the opening flange. If spacers are provided at a plurality of (suitably selected) points along the roof opening of the vehicle body, then the gap can be set to a desired value all around. This allows a dirt-free and, at the same time, reproducible sealing connection of the roof module in the vehicle body if a complete adhesive bead extending around the roof opening is provided between the roof module and the opening flanges.

Preferably, the spacers are arranged in the roof opening of the vehicle body in such a manner that they are located on the side of the adhesive bead which side is adjacent to the interior of the roof opening. Then, the spacers support the roof module outside the joint area intended for the adhesive bead, thereby allowing a continuous adhesive connection to be provided all around between the peripheral opening flange and the roof module.

In one embodiment of the present invention, the spacers are formed by upwardly angled edge regions of the opening flange. In this case, the edge region of the opening flange may be angled upwards all around. In the assembly position with the roof module lying on the top edge of the spacer, this angled edge region forms a barrier, which prevents the adhesive from leaking into the interior of the roof opening. Thus, contamination of the interior with adhesive is prevented even in the case of tolerance deviations in the position of the adhesive bead in the overlap region of the opening flange with the roof module. Alternatively to the continuous peripheral angled edge region, the spacer may be formed by locally interrupted angled edge regions of the opening flanges.

In an alternative embodiment, the spacers are formed by plug-in elements provided with fixing tongues, which are supported in pockets of the opening flange. These plug-in elements are inserted into the pockets provided for this purpose prior to installing the roof module. This embodiment has the advantage of being variable with respect to the roof module types to be installed into the vehicle bodies. Thus, the use of plug-in elements that are adapted to the particular roof module used allows roof modules of different material thickness and type (fixed roof with or without sliding roof, full-opening roof system, glass roof, . . . ) to be installed into the roof opening without the need to modify the bodyshell (in particular, the position of the opening flanges with respect to the side and cross rails). The plug-in elements, which are adapted to the particular type of roof module, ensure that the gap between the roof module and the opening flange has the desired size. Preferably, the plug-in elements are made of plastic or a coated metal material to prevent contact corrosion with the opening flange.

BRIEF DESCRIPTION OF THE DRAWINGS

The present invention is explained in more detail below with reference to several exemplary embodiments illustrated in the drawings, in which:

FIG. 2 is a detail sectional view of the assembly of the vehicle body and the roof module, in which

FIG. 3 is a detail view of the assembly of the vehicle body and the roof module showing a spacer according to a first embodiment:

FIG. 4 is a detail view of the assembly of the vehicle body and the roof module showing a spacer according to a second embodiment:

DETAILED DESCRIPTION

Figure 1:
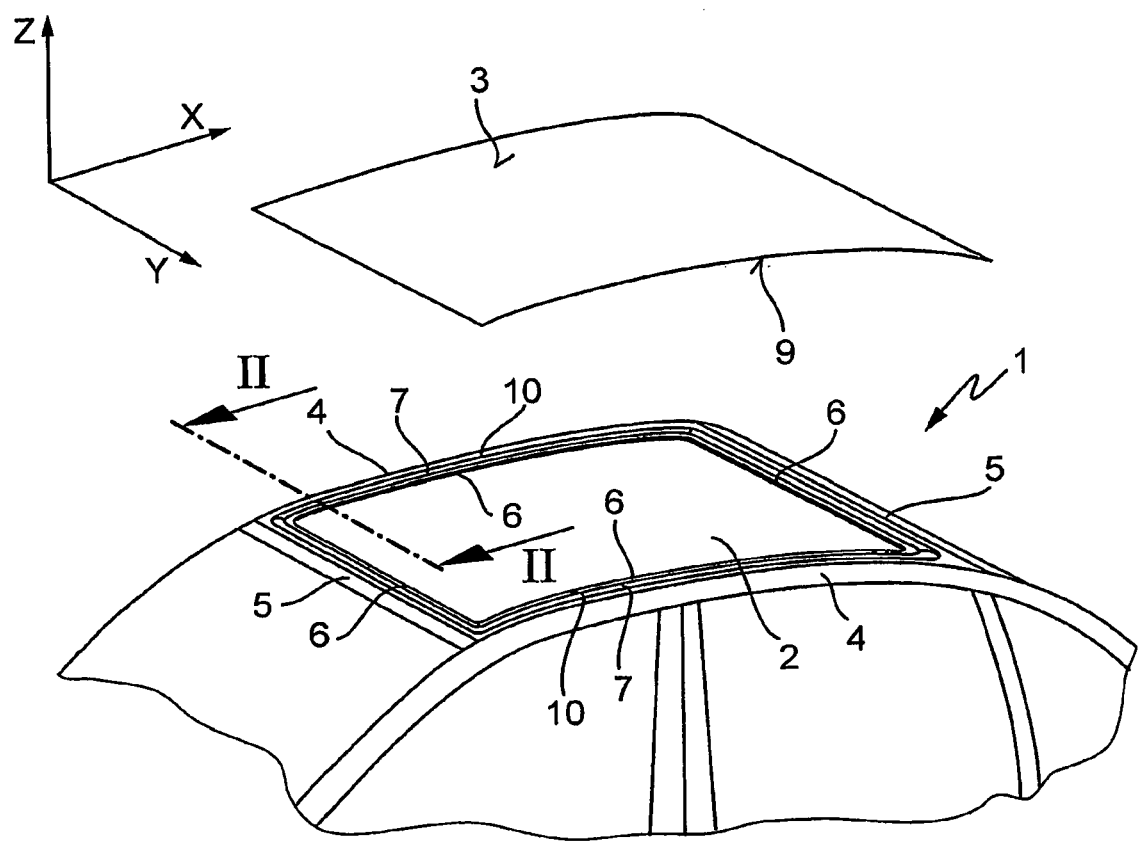
FIG. 1 is a perspective schematic view of a vehicle body and a roof module to be installed.

FIG. 1 is a perspective view of a vehicle body 1 having a roof opening 2 into which a roof module 3 is to be installed. Roof opening 2 is bounded by side rails 4 in vehicle transverse direction Y and by a front and a rear cross rail 5 in vehicle longitudinal direction X. Roof opening 2 is provided with opening flanges 6 which extend around the edge thereof and in the area of which roof module 3 is connected to vehicle body 1.

To connect roof module 3 to opening flanges 6, an adhesive bonding process is used: As schematically shown in FIG. 1, this is done during roof assembly by applying an adhesive bead 7 to opening flange 6, after which roof module 3 is placed on the adhesive bead. Adhesive bead 7 may have any cross-sectional profile (triangular, oval, . . . ) and is sized such that, after roof module 3 is placed onto the roof opening 2 provided with adhesive bead 7, gap 8 in the joint area between inner surface 9 of roof module 3 and upper surface 10 of opening flange 6 is bridged by adhesive 12. In the exemplary embodiment of FIG. 1, adhesive bead 7 extends around the entire roof opening 2, the intention of this being to produce an adhesively bonded connection all around between roof module 3 and vehicle body 1. Alternatively, adhesive bead 7 may also be provided only in sections along opening flange 6. In this case, however, additional seals must be provided to achieve a sealing connection of roof module 3 to vehicle body 1. Alternatively or in addition to applying adhesive bead 7 to opening flange 6 of vehicle body 1, which is shown in FIG. 1, adhesive bead 7 may also be applied to inner surface 9 of roof module 3.

Figure 2A:
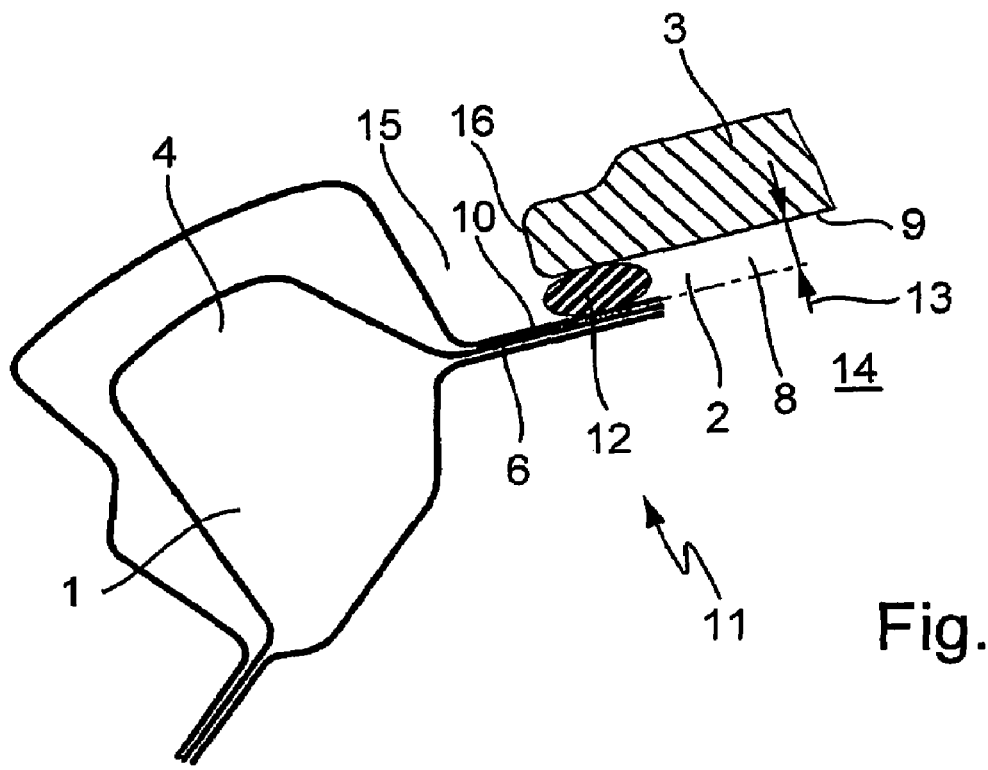
FIG. 2a shows a proper gap and FIG. 2b shows an insufficient gap between the roof module and the openings flanges.

FIG. 2a is a detail view of the assembly 11 of vehicle body 1 and roof module 3 in a cross-sectional schematic representation. Between inner surface 9 of roof module 3, said inner surface facing opening flange 6, and upper surface 10 of opening flange 6, said upper surface facing roof module 3, there is an adhesive layer 12, which is formed by partially compressing adhesive bead 7 during the installation of roof module 3, and which bridges gap 8 between opening flange 6 and roof module 3. Gap height 13 determines the degree to which adhesive bead 7 is compressed. In the case shown in FIG. 2a, adhesive bead 7 is compressed to the desired degree. In this case, gap 8 between roof module 3 and opening flange 6 is filled with adhesive 12; at the same time, gap 8 is sufficiently high so that no leakage of adhesive into the interior 14 of vehicle body 1 or into the roof trench 15 formed between roof module edge 16 and side rail 4 is observed. In a later assembly step, roof trench 15 is closed by a trim strip 17 (not shown in FIG. 2a), which is clipped to side rail 4.

Figure 2B:
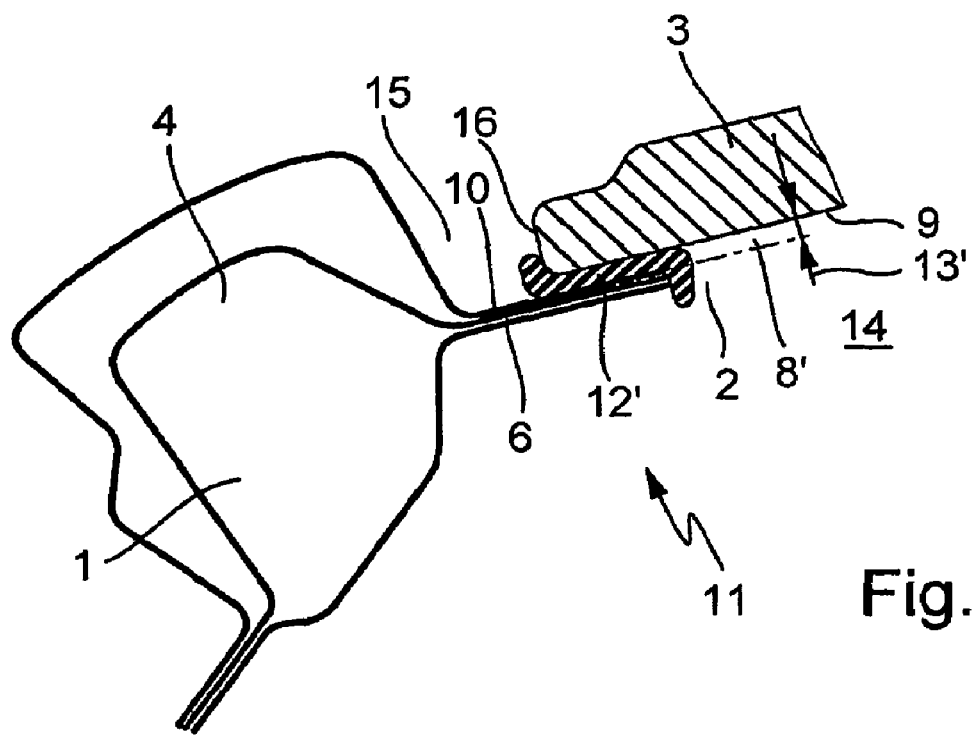

In contrast to the proper position and compression of adhesive 12 illustrated in FIG. 2a, FIG. 2b shows a case where roof module 3 has moved too deep into roof opening 2. In these cases, height 13' of gap 8' is too small so that adhesive 12' is partially forced out of the joint area and leaks into the interior 14 of vehicle body 1 and into roof trench 15, where it leads to contaminations and irregularities during the subsequent assembly process (for example, during the installation of the roof trim strip).

Figure 3A:
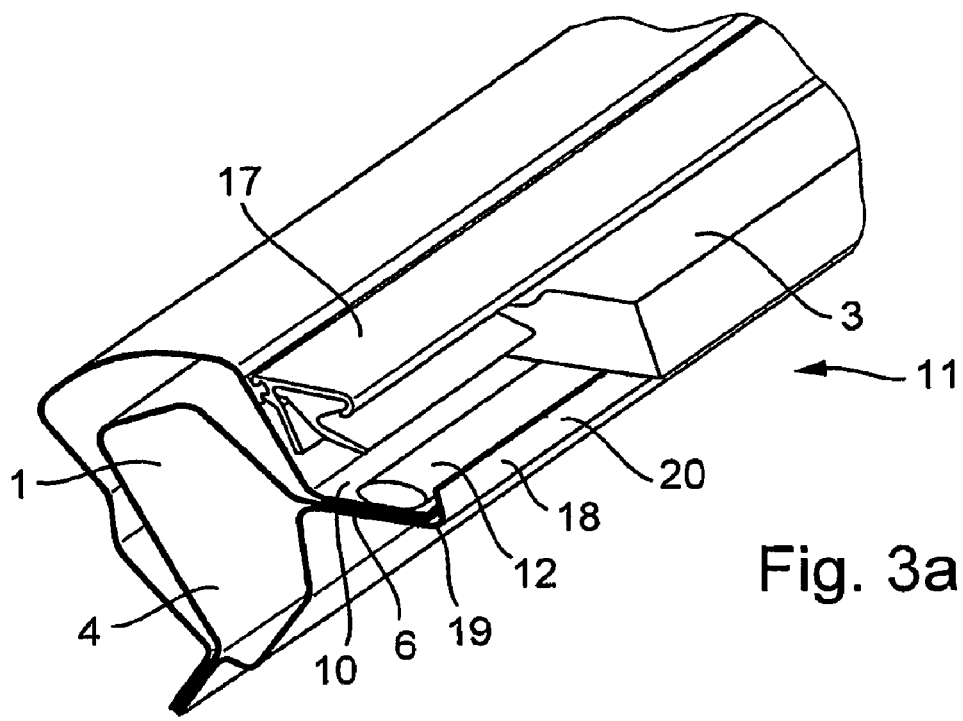
FIG. 3a shows the assembly in a perspective view.
Figure 3B:
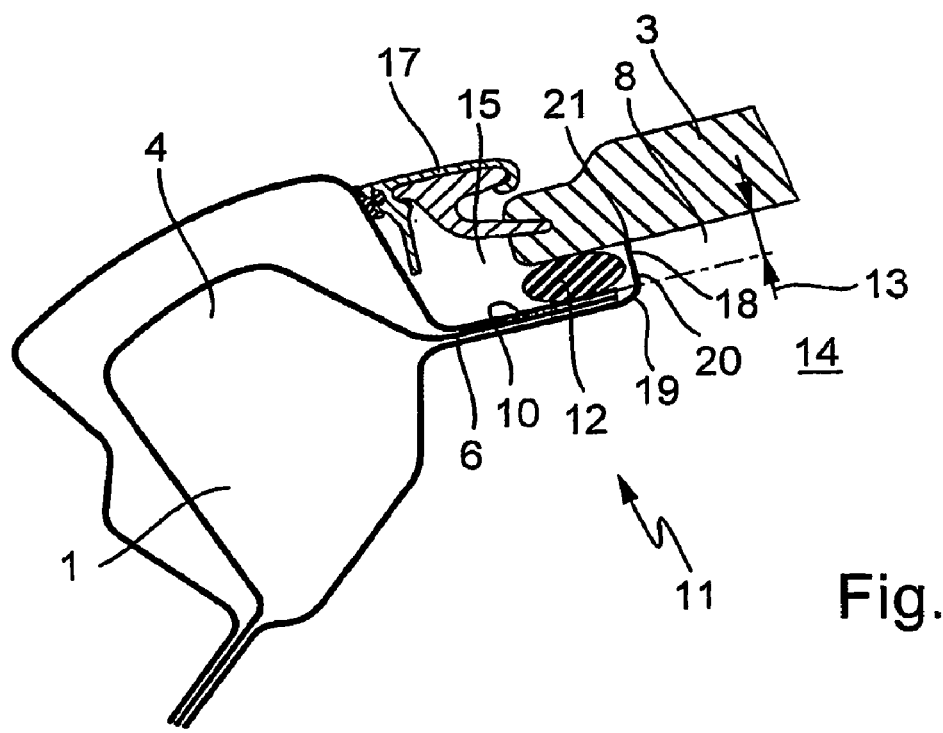
FIG. 3b shows a sectional view.

In order to prevent such a leakage of adhesive into vehicle interior 14 or roof trench 15, it must be ensured that gap 8 between roof module 3 and opening flange 6 has a predetermined height 13 that is geared to the cross-sectional profile of adhesive bead 7. To this end, opening flange 6 is provided with a spacer (or a plurality of spacers) 18 which holds inner surface 9 of the roof module 3, which is placed on roof opening 2, at the predetermined height 13 with respect to upper surface 10 of opening flange 6. In the exemplary embodiment of FIGS. 3a and 3b, this spacer 18 is formed by an edge region 20 of one of the metal sheets 19 of opening flange 6, the metal sheet in question being turned up in this edge region 20 adjacent to roof opening 2. The length of upwardly angled edge region 20 is selected such that a gap 8 having the desired height 13 is formed between upper surface 10 of opening flange 6 and a roof module 3 placed on the outermost edge 21 of edge region 20. Thus, upwardly angled edge region 20 prevents roof module 3 from moving too deep into roof opening 2 and, at the same time, forms a barrier preventing adhesive 12 from leaking into the interior 14 of vehicle body 1 (for example, in the case of an incorrectly positioned adhesive bead). Upwardly angled edge region 20 may be continuous in the entire roof opening 2, or locally interrupted.

Figure 4A:
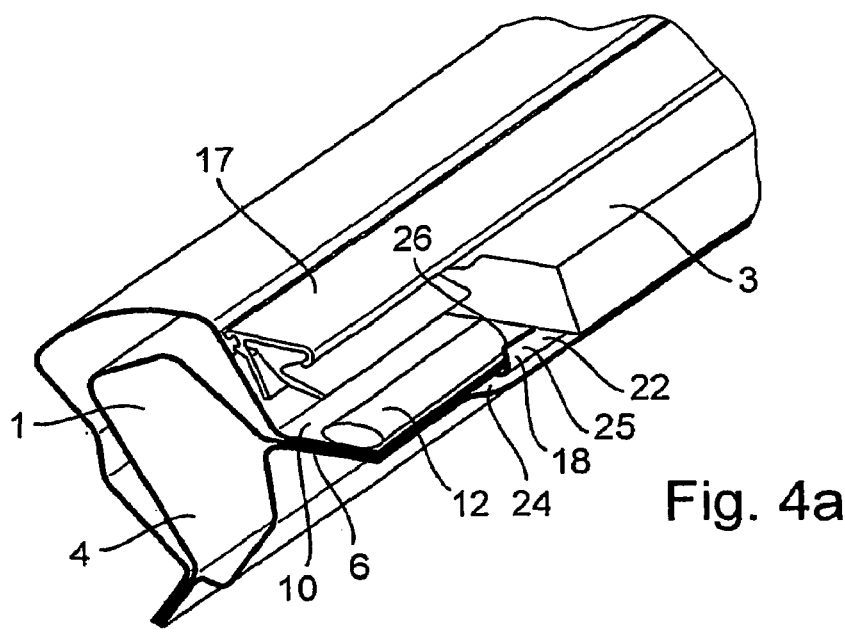
FIG. 4a shows the assembly in a perspective view.
Figure 4B:
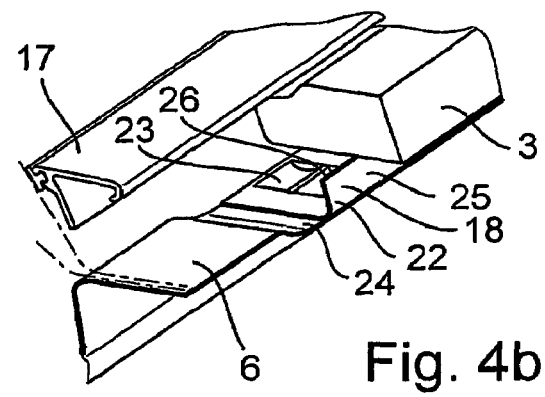
FIG. 4b is a detail view of a plug-in element inserted in the opening flange.
Figure 4C:
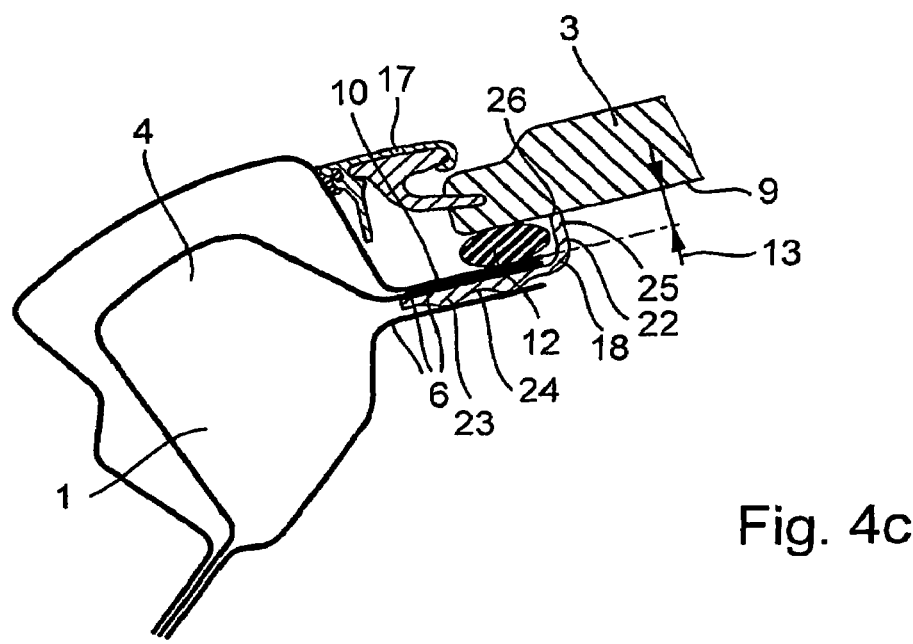
FIG. 4c shows the assembly in a sectional view.

FIGS. 4a through 4c show an alternative embodiment of spacer 18, which here is formed by a plug-in element 22 made of a plastic and having a fixing tongue 23 which is inserted into a pocket 24 in opening flange 6. The end of plug-in element 22 opposite fixing tongue 23 is configured as a shoulder 25 projecting approximately perpendicularly from fixing tongue 23. In the assembly position of roof module 3 and vehicle body 1, roof module 3 rests on face 26 of the upwardly projecting shoulder 25 of plug-in element 22. The length of shoulder 25 is such that a gap 8 having the desired clear height 13 for adhesive layer 12 is provided between inner surface 9 of roof module 3 and upper surface 10 of opening flange 6. Gap 8 can be varied by using different plug-in elements 22 having shoulders 25 of different shape and length. An arbitrary number of pockets 24 may be provided along opening flanges 6 to receive plug-in elements 22. Advantageously, plug-in elements 22 are inserted into pockets 24 only shortly before the installation of roof module 3 when it is clear which type of roof module 3 is to be installed into the vehicle body 1 in question.

In addition to the above-describes embodiments of spacers 18 in the form of turned-up flanges 20 (FIGS. 3*a* and 3*b*) and in the form of plug-in elements 22 (FIGS. 4*a* through 4*c*), combinations of these embodiments are also possible (so that, for example, turned-up flanges 20 are provided in the area of cross rails 5 while plug-in elements 22 are inserted in the area of side rails 4.

What is claimed is:

1. A vehicle roof assembly comprising:
   a vehicle body defining a roof opening and including an opening flange adjacent to the roof opening;
   a roof module having an outer edge disposed on the opening flange and an interior surface facing an upper surface of the opening flange;
   an adhesive bead disposed between outer edge and the flange and permanently connecting the roof module to the opening flange; and
   at least one spacer disposed in an area of the opening flange and being formed by a turned-up edge region of the opening flange, wherein the spacer sets a distance between the interior surface of the roof module and the upper surface of the opening flanges to a predetermined value.

2. The assembly as recited in claim 1, wherein the adhesive bead includes a continuous bead extending around the entire roof opening.

3. The assembly as recited in claim 1, wherein the at least one spacer is disposed between the adhesive bead and an interior of the roof opening.

4. A vehicle roof assembly comprising:
   a vehicle body defining a roof opening and including an opening flange adjacent to the roof opening;
   a roof module having an outer edge disposed on the opening flange and an interior surface facing an upper surface of the opening flange;
   an adhesive bead disposed between outer edge and the flange and permanently connecting the roof module to the opening flange;
   at least one spacer disposed in an area of the opening flange and setting a distance between the interior surface of the roof module and the upper surface of the opening flange to a predetermined value, wherein the at least one spacer is formed by a plug-in element having a fixing tongue supported in a pocket of the opening flange.

5. The assembly as recited in claim 4, wherein the plug-in element includes is plastic.

6. The assembly as recited in claim 4, wherein the adhesive bead includes a continuous bead extending around the entire roof opening.

7. The assembly as recited in claim 4, wherein the at least one spacer is disposed between the adhesive bead and an interior of the roof opening.

* * * * *

UNITED STATES PATENT AND TRADEMARK OFFICE
CERTIFICATE OF CORRECTION

| | | |
|---|---|---|
| PATENT NO. | : 7,144,076 B2 | Page 1 of 1 |
| APPLICATION NO. | : 10/535797 | |
| DATED | : December 5, 2006 | |
| INVENTOR(S) | : Roland Wendler and Thomas Zirbs | |

It is certified that error appears in the above-identified patent and that said Letters Patent is hereby corrected as shown below:

Claim 1, column 6, line 3, "flanges" should be changed to --flange--.

Signed and Sealed this

Twenty-seventh Day of March, 2007

JON W. DUDAS
*Director of the United States Patent and Trademark Office*